(12) United States Patent
Nelson et al.

(10) Patent No.: US 10,124,345 B2
(45) Date of Patent: Nov. 13, 2018

(54) PORTABLE MINING APPARATUS AND METHODS OF USE

(71) Applicant: Mineworx Technologies Ltd., Burnaby (CA)

(72) Inventors: Duane Nelson, North Vancouver (CA); James Anderson, Sioux Falls, SD (US)

(73) Assignee: Mineworx Technologies, Ltd., Burnaby, British Columbia (CA)

( * ) Notice: Subject to any disclaimer, the term of this patent is extended or adjusted under 35 U.S.C. 154(b) by 856 days.

(21) Appl. No.: 14/097,889

(22) Filed: Dec. 5, 2013

(65) Prior Publication Data
US 2015/0158032 A1    Jun. 11, 2015

(51) Int. Cl.
| | |
|---|---|
| B03B 7/00 | (2006.01) |
| G06Q 10/06 | (2012.01) |
| G06Q 50/02 | (2012.01) |
| C02F 9/00 | (2006.01) |
| C02F 1/00 | (2006.01) |
| C02F 1/38 | (2006.01) |
| C02F 1/52 | (2006.01) |
| C02F 11/12 | (2006.01) |
| C02F 101/20 | (2006.01) |
| C02F 103/10 | (2006.01) |

(52) U.S. Cl.
CPC .............. *B03B 7/00* (2013.01); *C02F 9/00* (2013.01); *G06Q 10/0635* (2013.01); *G06Q 50/02* (2013.01); *C02F 1/004* (2013.01); *C02F 1/006* (2013.01); *C02F 1/385* (2013.01); *C02F 1/52* (2013.01); *C02F 11/121* (2013.01); *C02F 2001/007* (2013.01); *C02F 2101/20* (2013.01); *C02F 2103/10* (2013.01); *C02F 2201/008* (2013.01); *C02F 2209/001* (2013.01); *C02F 2209/11* (2013.01); *C02F 2301/046* (2013.01)

(58) Field of Classification Search
CPC combination set(s) only.
See application file for complete search history.

(56) References Cited

U.S. PATENT DOCUMENTS

| | | | |
|---|---|---|---|
| 3,493,266 A | 2/1970 | Hazlitt et al. | |
| 3,910,837 A * | 10/1975 | Good | B03B 7/00 209/461 |
| 4,160,566 A * | 7/1979 | McGee | E21C 27/00 299/1.05 |
| 4,302,328 A | 11/1981 | Van Note | |
| 4,339,043 A * | 7/1982 | Tice | B03B 5/26 209/251 |

(Continued)

OTHER PUBLICATIONS

Proline Equipment for Sale, Belda's, 2014, Belda's http://www.goldbummin.com/proline-mining-equipment-for-sale.html, p. 1-2.*

*Primary Examiner* — Eric W Stamber
*Assistant Examiner* — Joseph M Waesco
(74) *Attorney, Agent, or Firm* — Merchant & Gould P.C.

(57) ABSTRACT

Methods of use of a portable mining apparatus in qualifying a mining site are disclosed. One method includes positioning a portable mining apparatus at a mining site, and providing raw mining material to the portable mining apparatus. The portable mining apparatus is configured to extract a classified material from the raw mining material. The method includes, based on success in extracting classified material, evaluating the feasibility of the mining site.

15 Claims, 10 Drawing Sheets

(56) References Cited

U.S. PATENT DOCUMENTS

| | | | | |
|---|---|---|---|---|
| 4,491,279 A * | 1/1985 | Long | | B02C 2/00 |
| | | | | 241/101.75 |
| 4,536,286 A | 8/1985 | Nugent | | |
| 4,553,443 A | 11/1985 | Rossfelder et al. | | |
| 5,490,924 A | 2/1996 | Macia et al. | | |
| 5,844,564 A * | 12/1998 | Bennis | | G06T 17/20 |
| | | | | 345/423 |
| 8,137,550 B1 * | 3/2012 | Moe | | C02F 1/38 |
| | | | | 175/206 |
| 8,267,335 B2 * | 9/2012 | Liubakka | | C22B 1/00 |
| | | | | 241/1 |
| 8,303,824 B2 | 11/2012 | Miller | | |
| 8,347,960 B2 * | 1/2013 | Mothersbaugh | | E21B 43/40 |
| | | | | 166/267 |
| 2002/0123844 A1 * | 9/2002 | Valls | | G01V 11/00 |
| | | | | 702/5 |
| 2003/0225606 A1 * | 12/2003 | Raghuraman | | G01V 11/00 |
| | | | | 705/7.28 |
| 2005/0261841 A1 * | 11/2005 | Shepard | | G06F 19/3493 |
| | | | | 702/32 |
| 2008/0015873 A1 * | 1/2008 | Shostack | | G06Q 20/127 |
| | | | | 705/16 |
| 2009/0084545 A1 * | 4/2009 | Banerjee | | E21B 49/00 |
| | | | | 166/250.15 |
| 2012/0095639 A1 * | 4/2012 | Makela | | E21F 13/025 |
| | | | | 701/25 |
| 2012/0292186 A1 | 11/2012 | Adamson | | |
| 2013/0075344 A1 * | 3/2013 | Wade | | C02F 11/121 |
| | | | | 210/747.4 |
| 2013/0197737 A1 * | 8/2013 | Malayappalayam Shanmugam | | E21F 17/18 |
| | | | | 701/29.1 |
| 2014/0129479 A1 * | 5/2014 | Warner | | G01V 1/306 |
| | | | | 705/348 |

\* cited by examiner

PORTABLE MINING APPARATUS AND METHODS OF USE

BACKGROUND

Mining systems, and in particular mining systems designed for heavy or precious metals, generally include many large-scale systems and subsystems used to classify and process various sediment types, thereby extracting the heavy or previous metals from sediment. Such mining systems generally require use of a substantial amount of water with which sediments are separated from heavy or previous metals. This water is generally retrieved from a nearby water source, such as a lake or river. Once used in the heavy metal extraction process, the now sediment-filled water is stored in settlement pools near the mining operation, which allow the sediments discarded as part of the mining process to separate from the water. Once the sediments and water separate, the water can then be returned to the water source.

These existing mining systems have numerous drawbacks. First, such a system can be difficult to transport, particularly to a location which is not readily accessible by heavy machinery. Second, such a system generally requires a large environmental footprint. That is both because of the size of the equipment used as well as the size of the sediment pools required to allow for settlement of sediments out of the water. Furthermore, such systems require a large volume of water to perform the heavy metal extraction process. Third, permanent mining systems require significant initial capital investment.

The above disadvantages of existing mining systems lead them to be unsuitable for use in many locations. For example, in particularly arid conditions, there may be only a limited water source, which is otherwise incapable of providing sufficient water for mining operations. Furthermore, in part due to the environmental impact of existing mining operations, many states, such as Nevada, California, and Arizona, as well as other international jurisdictions, restrict mining operations in particular areas (or overall). For example, many states are trying to mitigate potential environmental damage done by large mining equipment and potential groundwater contamination from large sediment pools and the protection of fish habitats due to suspended particulate in streams and rivers, and to conserve water. Accordingly, areas exist which may have substantial or economic heavy or precious metal deposits, but are unavailable for mining purposes due to difficulty in transporting mining equipment, lack of a convenient water source, or environmental regulations restricting the footprint of a mining operation.

Such limitations exacerbate problems relating not only to areas in which it is difficult to transport large-scale processing or mining equipment or where environmental regulations exist, but also to mining situations in which an economic case for such large scale mining operations is unproven. It can be difficult to justify the substantial expense of installing such large-scale mining equipment when production levels from a particular mining site are unproven.

It is with respect to this general environment that the embodiments of the present application are directed.

SUMMARY

In summary, the present disclosure relates to a mining apparatus with an integrated water reclamation system, as well as a process for its use. In some of the various embodiments discussed herein, the mining apparatus can be transported to and used in remote locations where transport, water supply, or environmental restrictions would otherwise prohibit mining operations, since many of the impacts of such typical mining operations are avoided. An additional advantage of the water reclamation system is that the wastewater discharged is eliminated or greatly reduced. Eliminating or reducing wastewater discharge is important because the discharged water could be contaminated or possibly classified as hazardous because of the impurities contained therein. Thereby, recycling water conserves water and also eliminates or greatly reduces the pollution and hazardous waste contamination of the environment resulting from conventional non-recycled water usage in mining operations. Reducing or eliminating the pollution can facilitate and expedite the permit-obtaining process, which is financially beneficial for the entity exploring the mining site.

In a first aspect, a method of use of a portable mining apparatus in qualifying a mining site is disclosed. One method includes positioning a portable mining apparatus at a mining site, and providing raw mining material to the portable mining apparatus. The portable mining apparatus is configured to extract a classified material from the raw mining material. The method includes, based on success in extracting classified material, evaluating the feasibility of the mining site. One advantage, of many, of using the portable mining apparatus to qualify a mining site is that, for a relatively small cost, the mining site can be validated as a producer site and receive a significant increase in the valuation of the minerals contained therein, thereby increasing the market capitalization of the mining site.

In a second aspect, a method for extracting metals from a mining site is disclosed. The method includes extracting raw mining materials from a mine site, delivering the raw mining materials to a portable mining apparatus, and processing the delivered raw mining materials with the portable mining apparatus. The method further includes separating metals from the raw mining materials, and removing the portable mining apparatus from the mine site.

In a third aspect, a method for providing a portable mining apparatus to a mining site is disclosed. The method includes transporting a portable mining apparatus to a mining site, positioning the portable mining apparatus in the mining site, and, after qualifying the mining site, removing the mobile processing apparatus from the mining site.

DETAILED DESCRIPTION

As briefly described above, embodiments of the present disclosure are directed to methods of using portable mining apparatus. In the various embodiments discussed herein, a portable mining apparatus can be transported to and used in remote locations where transport, water supply, or environmental restrictions would otherwise prohibit mining operations, since many of the impacts of such typical mining operations are avoided.

In accordance with the present disclosure, the present disclosure contemplates various applications of such portable mining apparatus. As further explained herein, the present disclosure contemplates positioning a portable mining apparatus at a mining site, and providing raw mining materials to that apparatus. The mining apparatus is configured to separate a classified material from non-classified materials, and based on that separation, evaluating a feasibility of a mining site.

In connection with the disclosure herein, a portable mining apparatus corresponds generally to a portable apparatus that can be used in connection with a mining operation. In some embodiments, the portable mining apparatus can include a mining material processing system or apparatus, in that the apparatus processes raw mining materials to extract classified materials from those raw mining materials. Accordingly, as further discussed below, some aspects include a portable mining apparatus, or portable processing apparatus included therein.

Figure 1:
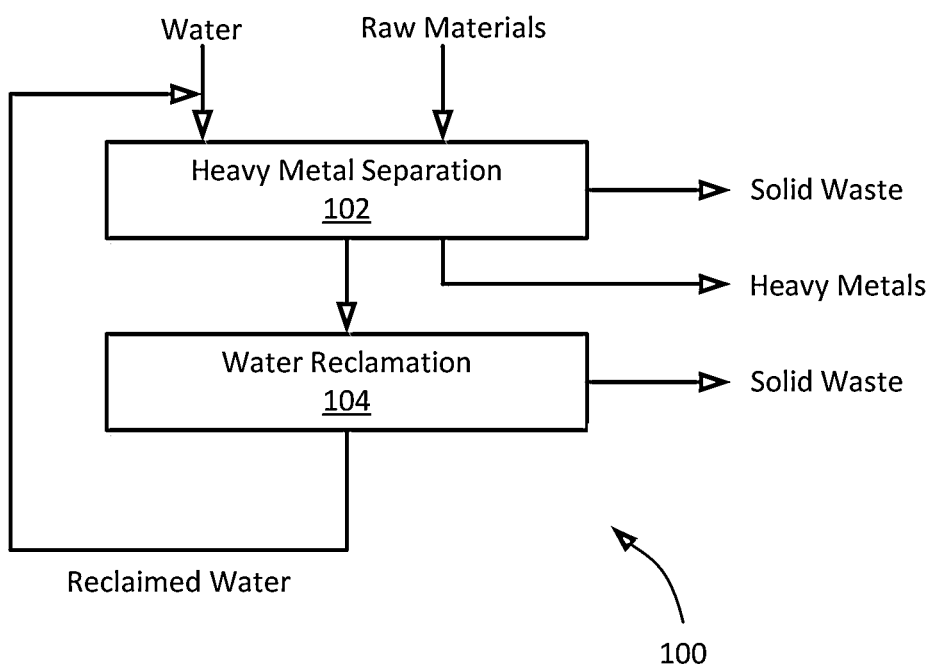
FIG. 1 is a general-purpose block diagram of a portable mining apparatus according to an example embodiment of the present disclosure.

I. Description of Example Embodiments of a Portable Mining Apparatus and General Operation of a Portable Mining Apparatus In accordance with the present disclosure, a general block diagram of an example portable mining apparatus 100 is illustrated in FIG. 1. As illustrated, the portable mining apparatus 100 generally includes a heavy metals separating subsystem 102 and a water reclamation subsystem 104. The heavy metals separating subsystem 102 generally receives raw mining materials as well as water from a water supply, and includes one or more components useable to separate heavy or precious metals from the raw mining materials, for example using systems including water. In particular, the heavy metals separating subsystem 102 can be configured to extract any of a variety of types of desirable heavy metals, including previous heavy metals such as gold or silver. In particular, in the embodiment shown, the heavy metals separating subsystem 102 outputs solid waste and heavy metals as well as a waste water and tailings mixture. Traditionally, such a mixture would be stored in settling ponds, allowing the sediment to precipitate out of the water prior to re-introducing the water back to the water source for the overall mining apparatus.

The heavy metals separating subsystem 102 is, in some embodiments, configured to be mountable to a vehicle-portable platform, such as a flatbed trailer capable of being towed by a vehicle to a mining site. One example of such a subsystem is illustrated in FIG. 2A, below, with a layout of components of such a subsystem illustrated in FIG. 5, below.

The water reclamation subsystem 104 is configured to be integrated with the heavy metals separating subsystem 102, and generally designed to receive tailings and waste water that would otherwise be placed into settling ponds to allow separation of sediments from water. The water reclamation subsystem 104 instead receives the tailings and waste water for treatment, and processes the tailings and waste water to allow for reuse of water within the heavy metals separating subsystem 102. In example embodiments, the water reclamation subsystem 104 is also portable, and mountable to a vehicle-portable platform (the same platform or a different one from the heavy metals separating subsystem 102). Furthermore, the water reclamation subsystem 104 can include various components including separators, filters, and/or clarifying processes, for separating reclaimed water from solid waste removed from the tailings and waste water. One example of such a subsystem is illustrated in FIG. 2B, below.

Figure 2A:
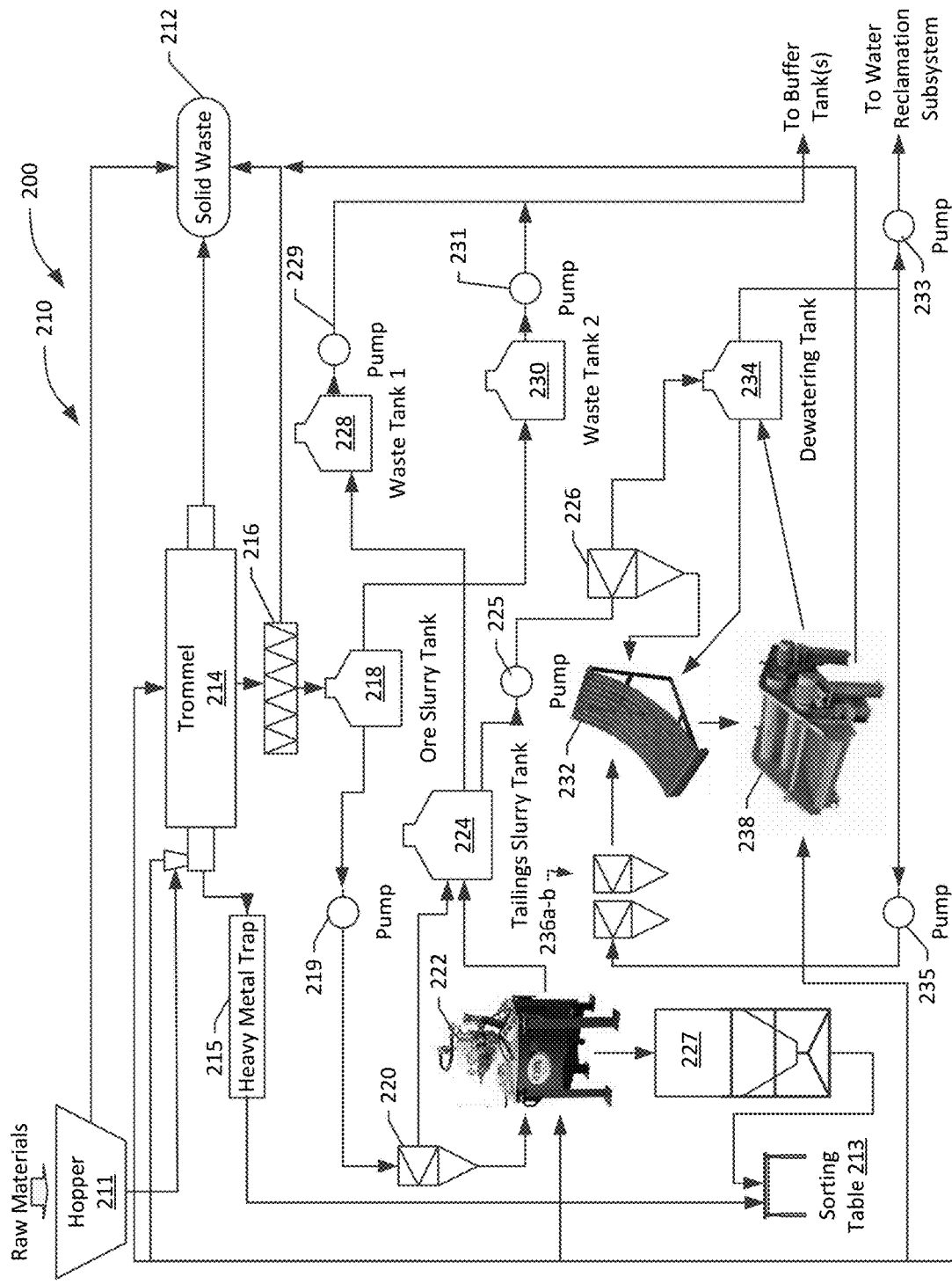
FIG. 2A is a logical diagram illustrating a portable mining apparatus according to an example embodiment of the present disclosure.
Figure 2B:
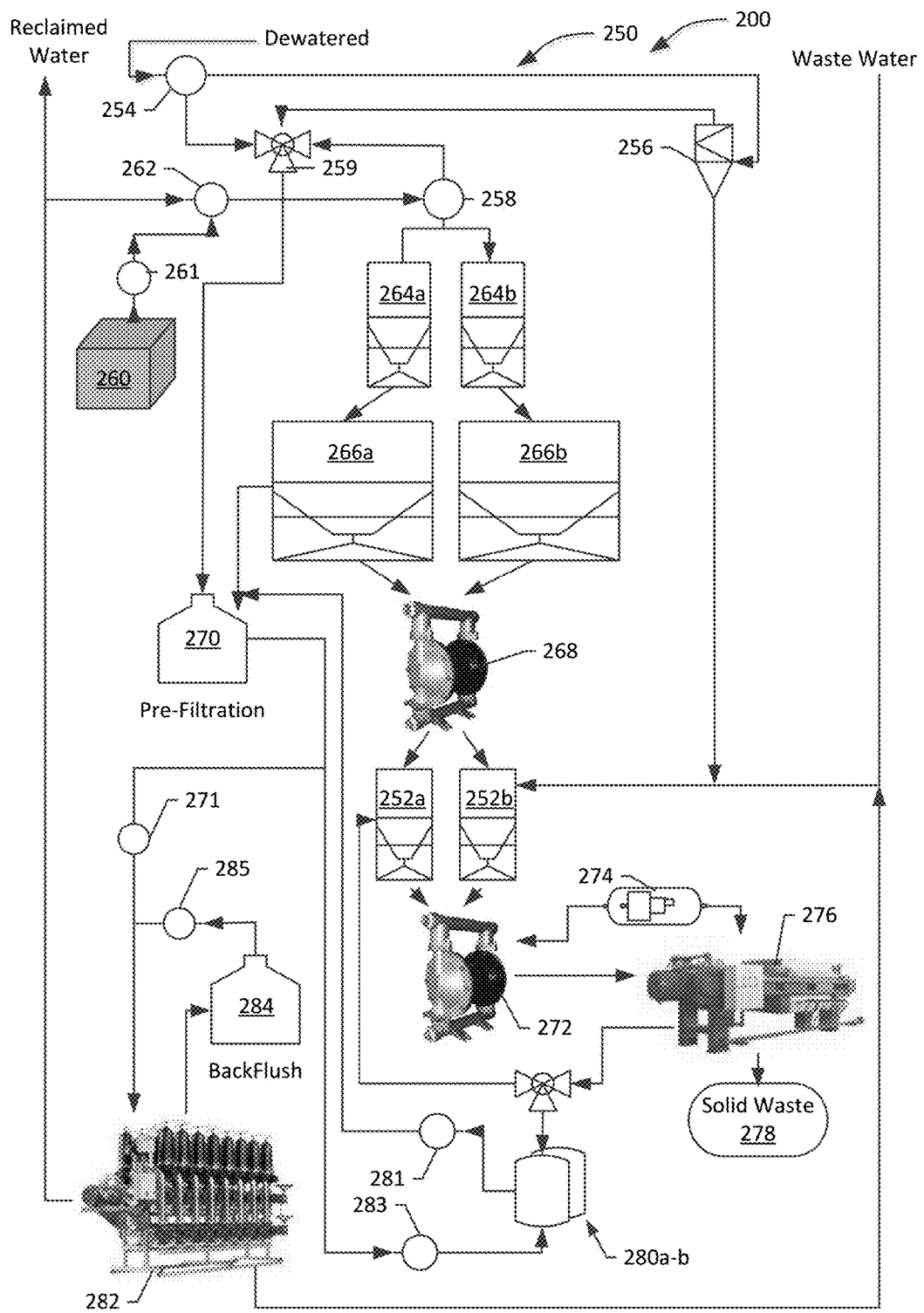
FIG. 2B is a logical diagram illustrating a portable mining apparatus according to an example embodiment of the present disclosure.

Referring now to FIGS. 2A-2B, a logical diagram illustrating a portable mining apparatus 200 is illustrated, according to a particular embodiment of the present disclosure. The portable mining apparatus 200 as shown can be, in some embodiments, a particular implementation of the apparatus 100 of FIG. 1. FIG. 2A illustrates a possible embodiment of a heavy metals separating subsystem 210, which can represent a possible arrangement of the heavy metals separating subsystem 102 of FIG. 1, while FIG. 2B illustrates a possible embodiment of a water reclamation subsystem 250, which can represent a possible arrangement of the water reclamation subsystem 104 of FIG. 1.

Referring to FIG. 2A specifically, the heavy metals separating subsystem 210 receives, in the embodiment shown, raw mining materials can first be classified using a grizzly (not shown) to arrive at mining particles below a first predetermined size, such as 1-3 inches in diameter. The mining materials below this size can be placed into a hopper 211. At the hopper 211, water is introduced to fluidize the mining materials. In an example embodiment, the mining materials can be routed to the hopper at a relatively high rate; for example, in a particular embodiment, the hopper can accept 20 tons per hour of raw mining materials, as well as 100 gallons of water per minute to fluidize the raw mining materials. From the hopper, materials larger than the predetermined size are discarded to a solid waste pile 212.

Materials from the hopper 211 are passed to a fluidizing trommel 214, which receives water from either a water source (not shown), or from a water reclamation subsystem, such a subsystem 250 discussed below and shown in FIG. 2B. The fluidizing trommel 214 receives additional water, for example a constant flow of about 80 gallons per minute, to assist in separating materials. The fluidizing trommel 214 separates the raw mining materials in a variety of ways. Solid waste, corresponding to materials greater than a second, smaller diameter (e.g., about 10-13 mm) is routed to a solid waste pile 212. Oversized heavy metals, caught by an oversize heavy metal trap 215, are caught and routed to a sorting table 213, such as a "gold table". Additionally, materials smaller than the second diameter are routed to a classifying screen 216.

At the classifying screen 216, still further separation of materials according to size is performed. For example, the classifying screen can separate materials greater than about 2 mm in diameter to be routed to the solid waste pile 212, while allowing smaller materials to pass into an ore slurry tank 218. The classifying screen 216 receives additional water to assist in the classification, but generally requires less water than the fluidizing trommel 214, for example about 10 gallons per minute, to form the slurry passing into the ore slurry tank 218.

From the ore slurry tank 218, a pump 219 routes a slurry at a high rate of throughput to a hydrocyclone 220, which increases the volume by weight of suspended particulate matter. The underflow from the hydrocyclone 220 is routed to a gravimetric separator 222, while the overflow is passed to a tailings tank 224. The gravimetric separator 222 receives the output of the hydrocyclone 220, as well as additional water, and extracts heavy metals from the slurry, passing the extracted heavy metals to a heavy metals concentration tank 227, and to the sorting table 213. Tailings from the gravimetric separator 222 are passed into the tailings tank 224.

From the tailings tank 224, a pump 225 routes tailings to a further hydrocyclone 226, while additional or overflow tailings are routed to a waste tank 228. Likewise, and referring back to the ore slurry tank 218, overflow from that tank can be routed to a waste tank 230 as well. The waste tanks 228, 230 are emptied by pumps 229, 231, respectively to one or more buffer tanks included in a water reclamation subsystem 250 of FIG. 2B, discussed below. Meanwhile the hydrocyclone 226 is used to again increase volume by weight of suspended particulate, prior to passing the tailings through a parabolic screen 232, and overflow to a dewatering tank 234. The parabolic screen 232 may also receive tailings from additional hydrocyclones 236*a-b*, and the tailings are pumped via pump 235 from the dewatering tank 234. A further dewatering vibrating screen 238 receives the output of the parabolic screen 232, and, when additional spray water is applied, separates tailings from solid waste, which is routed to the solid waste pile 212. Additionally, the dewatering tank 234 receives the output of the dewatering vibrating screen 238, thereby forming a cycle of water continuously screening and routing tailings to the dewatering tank 232. A pump 233 routes the screened tailings to a water reclamation subsystem 250.

Referring to FIG. 2A overall, it is noted that the heavy metals separating subsystem 210 includes a number of components requiring a water source. In the context of the present disclosure, the heavy metals separating subsystem 210 can use a stand-alone water source in conjunction with a water reclamation subsystem, or can alternatively operate for at least some time using the water reclamation subsystem alone. As seen in FIG. 2B, the water reclamation subsystem 250 receives waste water (including tailings, etc. from the waste tanks 228, 230 at buffer tanks 252*a-b*, and also receives water from a dewatering tank 232 at a turbidity meter 254. The turbidity meter 254 routes the water either to a centrifugal filter 256, and self-cleaning disc filters or sends the waste water to a flocculent injector 258 via a three-way valve 259. The flocculant injector 258 receives a flocculant from a clarifying system 260, which transmits a flocculant (clarifying agent) via a flocculant metering pump 261 and a mixer 262, which mixes the flocculant with cleaned water. In an example embodiment, the clarifying system is a flocculant application system made by Kemira Oyj of Helsinki, Finland. Other types of clarifying systems could be used as well.

The water and flocculant is then passed to one or more mixer tanks 264*a-b*, which can include, in some embodiments, a slow mixer tank and a fast mixer tank. The mixer tanks are then routed to holding (or clarification) tanks 266*a-b*, which hold the mixed sediment filled water and flocculant, until separation of sediments and water can occur. The sediments are then passed to the buffer tanks 252*a-b*, while the clarified water is passed via pump 268 to a pre-filtration tank 270. In the embodiment shown, each of the buffer tanks are sized to hold at least about 350 gallons, while the mixer tanks hold at least about 250 gallons. The holding tanks 266*a-b* are substantially larger, at about 1625 gallons each, which is an adequate amount of water to allow for settling to occur.

From the buffer tanks 252*a-b*, a waste pump 272, for example an air diaphragm pump powered by an air compressor 274, routes the waste to a filter press 276, which presses water out of settled solids, routing the solids to a solid waste collection 278. In the embodiment shown, the filter press compresses the waste, thereby extracting remaining water and outputting almost dry, solid bricks of sediment.

From the filter press 276, water is passed to balance tanks, 280*a-b*, which filter the extracted water, which is in turn pumped via pump 281 to the pre-filtration tank 270. In the embodiment shown, the balance tanks 280*a-b* are configured to hold and filter up to 1600 gallons of water; however, other capacities could be used as well. A pump 271 routes the clarified and/or filtered water to a disk filter system 282. The disk filter system 282 separates water from waste water, routing the waste water back to the buffer tanks 252*a-b*, and providing the water to the heavy metals separating subsystem 210 of FIG. 2A. In an example embodiment, the disk filter system 282 is a filter made by Arkal Filtration Systems of Jordan Valley, Israel. Other embodiments could use other types of filter systems as well.

In the embodiment shown, a backflush tank 284 and backflush pump 285 can be used to clean the disk filter system 282 when it becomes clogged. In the example embodiment shown, the backflush tank 284 is sized to hold about 150 gallons, although in other embodiments other sizes of tanks could be used. Additionally, one or more balance pumps, such as pump 283, can be included in the system to balance the throughput of the system.

It is noted that, although particular components are discussed above in connection with FIGS. 2A-2B, other components or configurations of a heavy metals separating subsystem 210 and a water reclamation subsystem 250 could be used. As such, the arrangement illustrated herein is intended as exemplary, rather than limiting.

Figure 3:
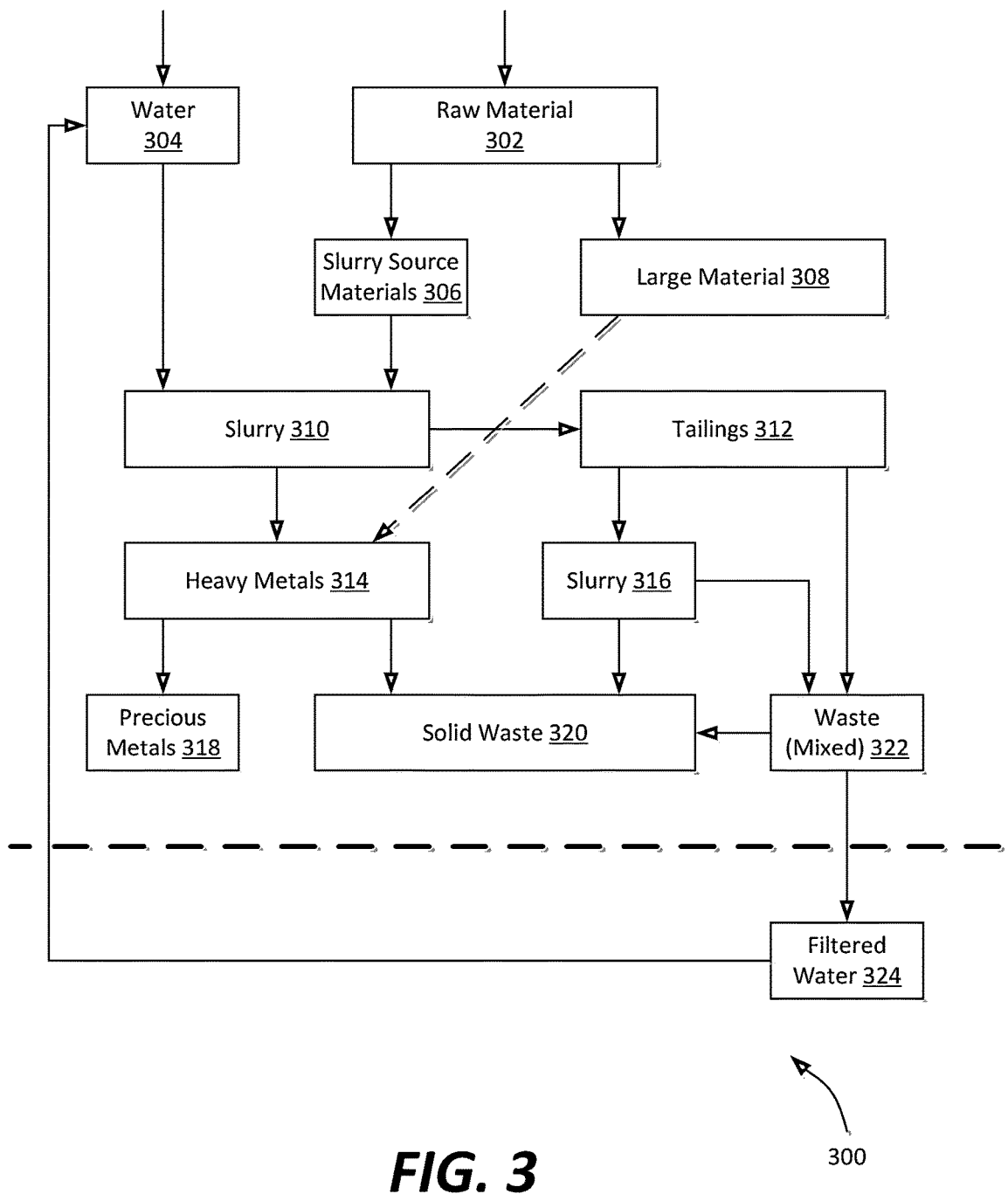
FIG. 3 is a block diagram illustrating a general progression of mining materials and water through a portable mining apparatus.

Referring now to FIG. 3, an example transformation 300 of raw materials and water in a portable mining apparatus according to the present disclosure is shown. The transformation 300 can occur, for example based on use of a portable mining apparatus, such as apparatus 100, 200 of FIGS. 1 and 2A-2B.

In the embodiment shown, raw materials 302 and water are provided to a portable mining apparatus, and large material 308 is separated from slurry source materials 306 which are raw materials below a predetermined size. This separation can occur using any of a variety of types of separating screens, trommels, or other categorization mechanisms. The water and slurry source materials are added to a slurry 310, which is then processed via hydrocyclones and/or gravimetric separators or other equipment such that heavy metals 314 are separated 312. The tailings are reintroduced into a slurry 316.

The heavy metals 314 are inspected and separated into precious metals 318 (e.g., gold, silver, or other heavy metals of value) and solid waste 320. This can occur, for example, via use of a sorting table or similar arrangement. Similarly, the slurry can be separated into solid waste 320 and waste water 322. The waste water can segmented, for example using additional sorting screens, into further solid waste 320 and waste water. The waste water is then passed to a water reclamation subsystem, which applies clarifying agents and filters to reclaim useable water.

Figure 4:
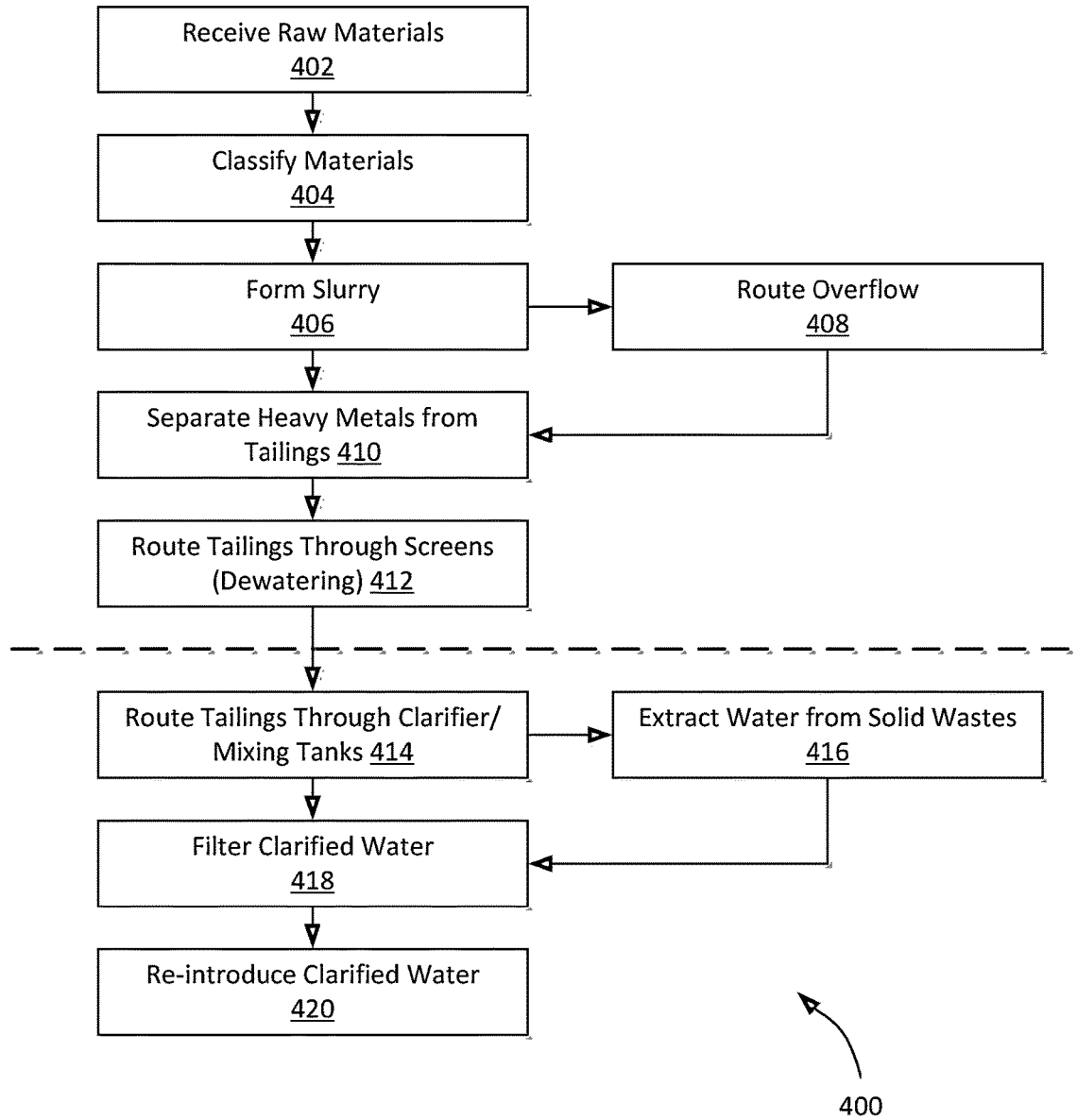
FIG. 4 is a flowchart illustrating a method of mining for heavy metals, according to an example embodiment.

Referring now to FIG. 4, a flowchart illustrating a method 400 of mining for heavy metals is shown, according to an example embodiment. The method 400 generally corresponds to the steps performed to transform the materials as illustrated in FIG. 3, and can be performed, for example, using any of the apparatus described above in FIGS. 1-2, or analogous systems. The method 400 can be performed at least in part by a user of such apparatus, or by control systems incorporated with such apparatus. The method 400 includes receiving raw materials at operation 402, and classifying those materials at operation 404. The classifying can occur based on any predetermined size, for example using one or more screening processes to remove large-scale particles. A slurry is formed at operation 406, and overflow of the slurry is routed to a holding tank at operation 408. Heavy metals are then separated from the tailings at operation 410, for example using a gravimetric separator and/or a sorting table. The tailings are then passed through screens as part of a dewatering operation 412.

The water used during operations 402-412 is next reclaimed for reuse, for example by routing the tailings through a series of screens and hydrocyclones and then a clarification process. The tailings generally are then separated and solid wastes are extracted. One or more filters can be used to filter the clarified water separated from the solid wastes at operation 418, and the clarified and filtered water is then re-introduced into the slurry for use in processing of subsequent raw mining materials.

It is noted that, although the general operational steps are depicted in FIG. 4, additional steps could be included in alternative processes, and that alternative equipment could be used to that discussed herein, in a manner consistent with the present disclosure.

Figure 5:
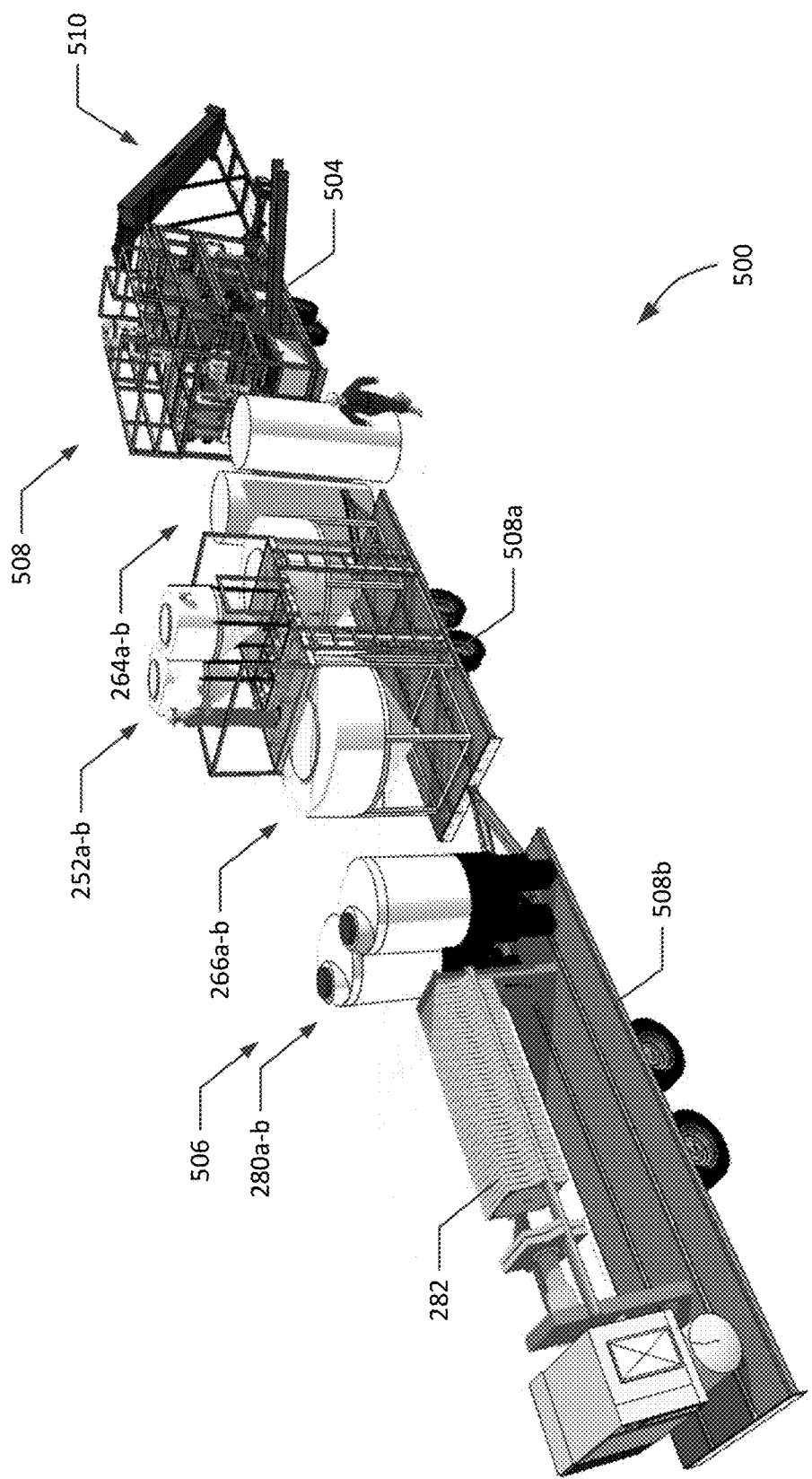
FIG. 5 is a perspective view of an example portable mining apparatus illustrating a possible layout of mining equipment on a vehicle-portable platform, according to one possible embodiment.

Referring now to FIG. 5. a perspective view of an example portable mining apparatus 500 is shown. The portable mining apparatus 500 can, in some embodiments, correspond to the apparatus 200 of FIGS. 2A-2B, when that apparatus is used in a portable arrangement.

In the embodiment shown, the portable mining apparatus 500 generally includes a heavy metal extraction subsystem 502 mounted at least in part to a vehicle-transportable surface, such as a flatbed trailer 504 or shipping container. The portable mining apparatus 500 also includes a water reclamation subsystem 506 mounted at least in part to one or more vehicle-transportable surface, such as a flatbed trailers 508a-b. In example embodiments, one or more components of the heavy metal extraction subsystem 502 and the water reclamation subsystem 506 can be located on the same or different trailers or surfaces. Furthermore, although in the embodiment shown three flatbed trailers are shown, more or fewer could be used, or could be stacked in shipping containers or other transportation methods could be used.

In the specific example embodiment shown, select aspects of a portable mining apparatus such as are shown in FIGS. 2A-2B are included in the portable mining apparatus 500. In particular, flatbed trailer 508b includes a disk filter system 282 as well as balance tanks 280a-b. Flatbed trailer 508a includes the buffer tanks 252a-b, as well as holding tanks 266a-b. Mixer tanks 264a-b are shown as located to receive water from the heavy metal extraction subsystem 502 on flatbed trailer 504, which can include component analogous to those illustrated in FIG. 2A. A raw materials elevator 510 can also be included for ease of delivery of materials to the heavy metal extraction subsystem 502.

Referring to the portable mining apparatus 500 generally, it is noted that various other arrangements of the components of FIGS. 2A-2B, or other components in different embodiments, could be placed in different configurations on one or more portable surfaces to allow for convenient transport of the mining apparatus to a mining site. Furthermore, and referring to FIGS. 1-5 generally, it is noted that one example benefit of the disclosed methods and systems over conventional mining operations is the ability to effectively extract heavy metals from the earth without harming the surrounding environment with any dangerous chemicals or solvents, and diminishing the surface disturbance and ground water contamination with the elimination or reduction of tailings containment areas or settling ponds.

II. Methods of Using a Portable Mining Apparatus in a Mining Site

In the various embodiments discussed herein, a portable mining apparatus, such as the one discussed above with respect to FIGS. 1-5, can be transported to and used in remote locations where transport, water supply, or environmental restrictions would otherwise prohibit mining operations, since many of the impacts of such typical mining operations are avoided. Additionally, a portable mining apparatus can be used in locations where it is not at present, or perhaps will never be, economically feasible to construct a permanent mining or processing apparatus. A portable mining apparatus can be used, for example, to evaluate the feasibility of a mining site, to mine a given amount of material from a site, and to qualify an explorer site as a producer site. FIGS. 6-10 and the accompanying description below provide example methods of using a portable mining apparatus at mining sites.

Generally, the methods discussed herein represent example analyses and uses of a portable mining apparatus to qualify a site currently in an exploration phase as a producer site. Additionally, the methods described herein can otherwise provide a "proof of concept" for mining at a particular site that will enable the mining site operator to obtain financing for a more permanent mining site to be established. Other options are also discussed herein.

Qualification of a mining site as a producer rather than an explorer is advantageous for many reasons. Among them is that an explorer site that is not yet producing receives a lower market valuation for unmined metal (i.e., metal "in the ground"), which in turn means a lower market capitalization for the site. Market capitalization reflects, among many considerations, doubt that the mining site can economically produce metals or other mined materials, and worries that until the mine site is qualified as a producer, the explorer is at risk of financial collapse.

As an illustrative example, an explorer site that proves up 1 million ounces of gold valued at $20 per ounce could be converted to a producer site by using a portable mining apparatus to prove economic feasibility of mining operations at the site. By moving the mining site into production, the value of the metal in the ground can increase dramatically, for example from $20 to $200 per ounce. Accordingly, the qualification raises the market capitalization of the mining site from $20 million to $200 million. Thus, the portability of the mining apparatus discussed herein enables the relatively rapid increase in market capitalization of the explorer site, enabling greater financial ability to continue mining, to install permanent mining equipment, or to extract value generally from the mining site.

One of many advantages of using the portable mining apparatus for qualification is that the portable mining apparatus can be leased for use by a mining site operator on the explorer mining site, until the site becomes a producer site. Use of the portable mining apparatus allows the lessee to establish a site as a producer site for a minimal financial cost compared to constructing a permanent processing plant. Additionally, because the site has a higher market capitalization after becoming a producer, the mining site can raise funds to construct a stationary mill or other permanent mining apparatus without significantly diluting the owner's shares in company stock, as compared to the dilution of an explorer-valued site typically required when funds are raised from investors. The portable mining apparatus can be used to essentially bootstrap operations until the mining site produces enough profit or sells enough stock to construct a stationary mill.

Figure 6:
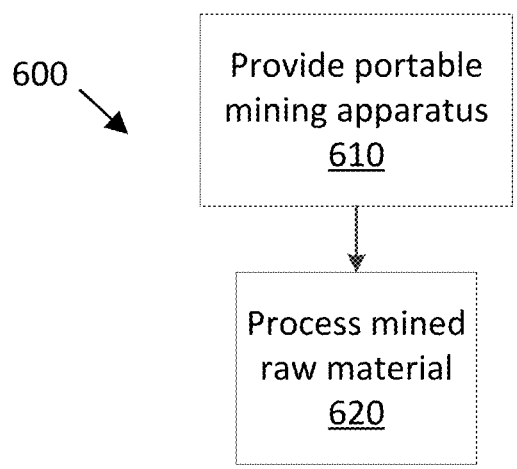
FIG. 6 is a flow chart of an example method of using a portable mining apparatus at a mining site.

In accordance with the present disclosure, a flow chart of an example method 600 for using a portable mining apparatus is illustrated in FIG. 6. The example method 600 includes first providing a portable mining apparatus 610. Providing a portable mining apparatus (step 610) is shown and described in more detail herein with reference to FIG. 9. Then the portable mining apparatus is used to process mined raw material (step 620). Examples of processing mined raw materials using a portable mining apparatus are described in more detail with reference to FIGS. 1-4.

Figure 7:
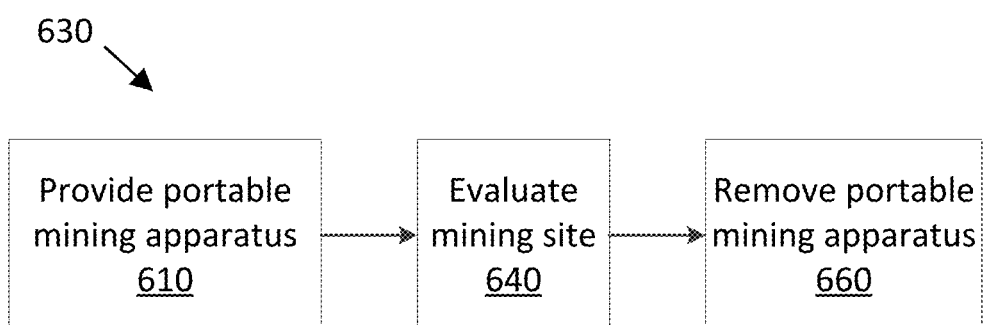
FIG. 7 is a flowchart illustrating an example method of using of a portable mining apparatus at a mining site.

Referring now to FIG. 7, a flowchart illustrating a method 630 of using of a portable mining apparatus at a mining site is shown, according to an example embodiment. Example method 630 includes providing a portable mining apparatus to a mining site, as discussed in step 610 above, evaluating the mining site (step 640), and removing the portable mining apparatus from the mining site (step 660). Providing a portable mining apparatus, as in step 610, is shown and described in more detail herein with reference to FIG. 9. Example components or operations included in evaluating a mining site, as in step 640, are shown and described in more detail herein with reference to FIGS. 8 and 10.

Figure 8:
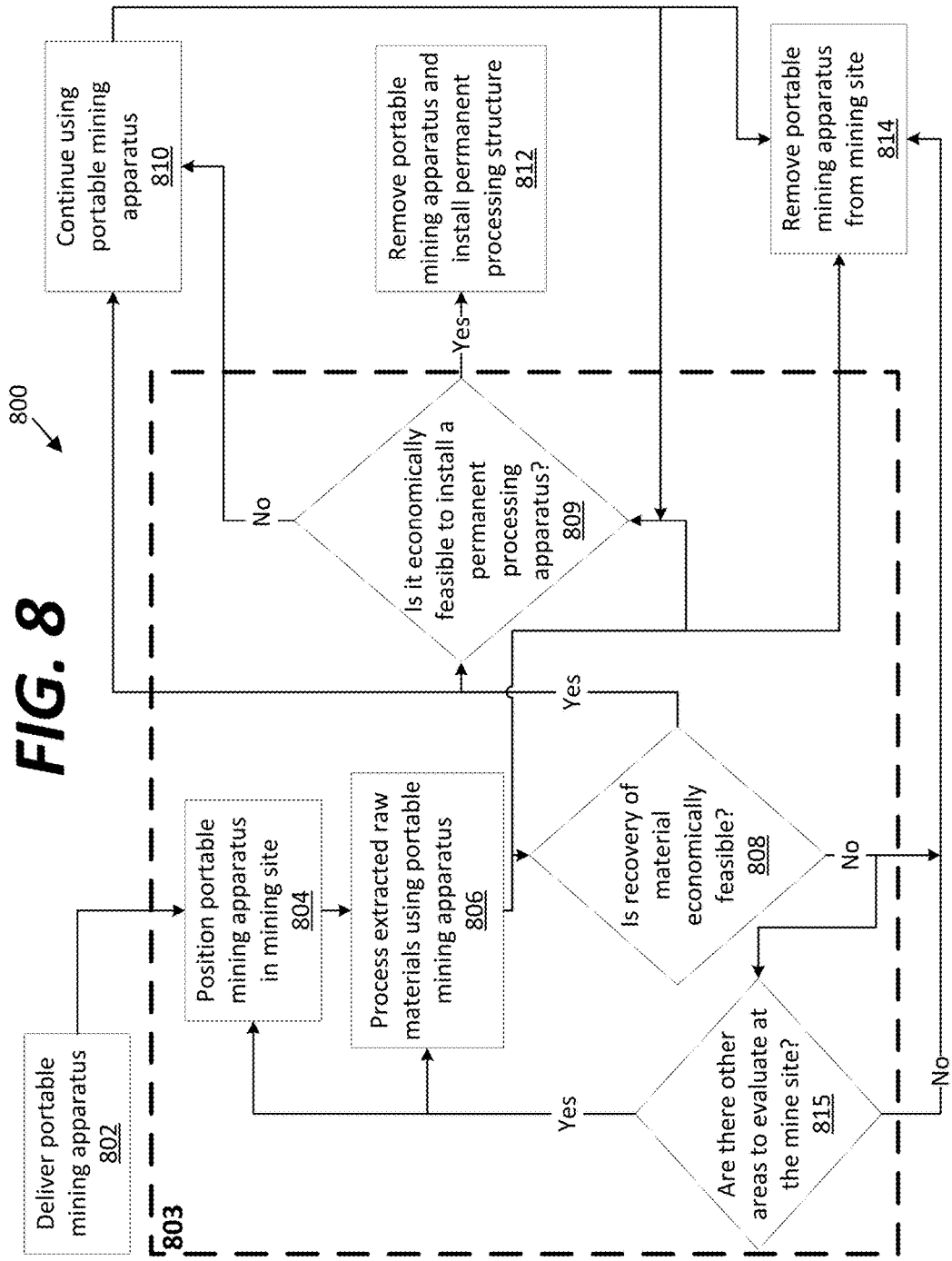
FIG. 8 is an example flowchart for a use of a portable mining apparatus in the evaluation of a mining site.

FIG. 8 illustrates an example flowchart of a method 800 for a use of a portable mining apparatus. In various embodiments, the method 800 can be performed by a mining company or subcontractor, or some combination thereof. In this example, the method 800 includes delivering a portable mining apparatus (step 802), positioning the portable mining apparatus at a mining site location (step 804), and processing extracted raw materials using the portable mining apparatus (step 806). Based on that processing, the method 800 further includes evaluating a mining site (step 803), which can include a determination of whether recovery of material is economically feasible (step 808), as well as a determination of whether installation of a permanent processing apparatus (which may take advantage of additional processing technologies not included in a portable mining apparatus) is economically feasible (step 809). Based on that evaluation, the method 800 can include one or more of a variety of outcomes. For example, in the example shown, three outcomes are possible: continued use of the portable mining apparatus at the mining site (step 810), removing the portable apparatus from the mining site (step 812), and removing the portable mining apparatus and installing a permanent processing structure (step 814). Other embodiments may exclude some or all of these steps or add additional steps.

In this embodiment, the use begins with the delivery of the portable mining apparatus (step 802). Delivery may be provided, for instance, via a semi-truck trailer, railroad car, shipping vessel, or the like. The apparatus is shipped, for example, mounted to a platform that can fit onto a semi-trailer or into an intermodal shipping container, or mounted directly to a transportation-ready component, such as a semi-truck trailer. Additional examples are shown and described above with reference to FIG. 5. In some embodiments, the portable mining apparatus is delivered to the location in the mining site where the apparatus will process extracted raw material. In other embodiments, the portable mining apparatus is delivered near the mining site, or at the mining site but not where the apparatus will be used. Then, in those embodiments, a different vehicle or vehicles, for example, a fork-lift, crane, or loader, is used to position the portable mining apparatus in the mining site. In still other embodiments, the components of the portable mining apparatus are transported to the mining site and the portable mining apparatus is arranged or assembled at the mining site. In various embodiments, delivery of the portable mining apparatus can be in connection with either a purchase of such apparatus, or a short-term lease of such apparatus, for example for proving a precious metals mining site for the purposes of obtaining financing for more extensive mining operations.

Notably, and compared to existing mining apparatus, delivering the portable mining apparatus to a particular location is greatly simplified based on its portable, easily set-up nature. Because the portable mining apparatus is quickly transported and set up for operation, both upfront and operational costs of a mining site are, at initial stages, greatly reduced.

Once the portable mining apparatus is delivered, the mining site is evaluated in an evaluation system 803. Evaluation of the mining site includes, in this example, positioning the portable mining apparatus in the mining site (step 804), processing extracted raw materials using the portable mining apparatus (step 806), the decision whether recovery of material is economically feasible (step 808), the decision whether it is economically feasible to install a permanent processing apparatus (step 809), and the decision whether there are other areas to evaluate at the mining site (step 815).

Positioning the apparatus in the mining site (step 804) includes physically moving the apparatus to the desired location. Additionally, in some embodiments, positioning the portable mining apparatus also includes preparing the apparatus for processing and/or assembling the components comprising the portable mining apparatus. Preparing the portable mining apparatus involves, for example, making electrical connections to and between individual components in the apparatus, preparing any generators that may power some of the apparatus, physically aligning modules of the apparatus, and removing some or all of the apparatus from the shipping containers or platforms. The positioning also includes, in some embodiments, orienting the portable mining apparatus to be in accord with the particular operational flow needs of the mine site.

Once the portable mining apparatus is positioned in the mining site, it is used to process extracted raw materials (step 806). Examples of processing mined raw materials using a portable mining apparatus are described in more detail with reference to FIGS. 1-4. In some embodiments, there is a predetermined amount of raw materials that must be processed before evaluating the economic feasibility of the mining site (step 808). In other embodiments, the amount of material processed by the portable mining apparatus before the economic feasibility analysis is determined by timing or monetary limitations. The raw mining material processed by the portable mining apparatus is extracted from the earth using methods known in the art. Also, the extracted raw mining material is provided or delivered to the portable mining apparatus using methods known in the art.

After an amount of raw material is processed, an evaluation can be made as to the economic feasibility of recovering additional material, such as heavy metals, from the mine site. This evaluation can be performed, for example, a period of time after mining using a portable apparatus has been occurring, for example based on a short-term or medium-term lease of the portable mining apparatus. In typical cases, the evaluation of evaluation system 1000 can be performed once first ore is run through the portable mining apparatus to determine whether precious metals extraction is feasible at the mining site.

Some circumstances, such as private entity or government intervention prohibiting further mining at the site, may prevent the use of the portable mining apparatus from reaching this step. In that instance, the portable mining apparatus is removed from the mining site (step 814) and steps and beyond are not reached. Example considerations weighing into whether recovery of the material is economically feasible are shown and described in more detail below, in connection with FIG. 10.

Alternatively, in some embodiments, after processing extracted raw materials using the portable mining apparatus, it is possible to evaluate whether it is economically feasible to install a permanent processing apparatus (step 812). For example, an entity might skip evaluation at step 808, because it already believes that recovery of material from the site is feasible. This could occur when the entity does not have financial resources to construct a permanent processing structure or if environmental certifications or permits are not yet secured. In some embodiments, the entity wishes to use the portable mining apparatus only to evaluate whether a permanent processing apparatus should be constructed at the mining site.

Returning to evaluation at step 808, in this example, there are two possibilities if the result of this evaluation is negative. First, the portable mining apparatus is removed from the mining site (step 814) without further analysis of the mining site. Second, the process alternatively proceeds to evaluation at step 809.

If the result of evaluation at step 808 is "yes," then the next step is either evaluation of permanent installation (at step 809) or to continue using the portable mining apparatus at the mining site (at step 810). In some embodiments, an entity may not be interested, either initially and/or until project completion, in constructing a permanent structure for processing at the site. In that case, the entity would not perform evaluation of permanent installation as in step 809 after the initial evaluation of economic feasibility in step 808. After skipping evaluation of permanent installation in step 809, the entity may decide at a later time to return to that evaluation to determine if constructing a permanent processing apparatus would be economically feasible.

Evaluation of other areas, as in step 815, assesses whether there are other areas of the mining site whose economic feasibility should be evaluated. For example, raw material excavated from a particular area of the mining site may not be representative of the entire mining site. In some embodiments, only a small area is initially excavated and processed before evaluating the economic feasibility, as a way to control costs. In other embodiments, relatively small samples from various areas of the mine site may be processed and analyzed before evaluating economic feasibility.

If the result of evaluation of other areas of a mining site indicates that there are such other areas, then in some embodiments the process returns to step 804 and the portable mining apparatus is repositioned. In other embodiments, after a "yes" at evaluation step 815, the portable mining apparatus is not repositioned and the portable mining apparatus resumes processing extracted raw material at step 806. If the result of evaluation step 815 is "no," then the portable mining apparatus is removed from the mining site, as in step 814.

Evaluation of permanent installation (step 809) examines whether it is economically feasible to install a permanent processing apparatus at the mining site. Considerations in this evaluation include, for example, the considerations shown in and described with reference to FIG. 10, the mining site's topography, the estimated cost of constructing a permanent processing apparatus, the estimated return on investment, the availability of funds or funding sources to finance the construction, and the difference in processing rates between the portable mining apparatus and the permanent processing apparatus.

If the result of evaluation of step 809 is that it is not economically feasible to install a permanent processing apparatus, then the portable mining apparatus will continue to be used at the mining site (step 810). It is conceivable that in some instances, if the result of evaluation is that it is not economically feasible to install permanent processing apparatus, mining operations could cease and the portable mining apparatus would be removed from the mining site (as in step 814).

Alternatively, if the result of the evaluation of permanent installation is that it is economically feasible to install a permanent processing apparatus, then the portable mining apparatus is removed and the permanent processing structure is constructed (step 812). In some embodiments, the portable mining apparatus is used to process raw material at the mining site until the permanent structure is constructed and/or operational. In other embodiments, the removal of the portable mining apparatus (step 814) occurs before or during the construction of the permanent processing structure.

After the portable mining apparatus is no longer needed to continue processing at the mining site (as in step 806), it is removed from the mining site (step 814). Removing the portable mining apparatus from the mining site is accomplished, in some embodiments, by performing the same actions as delivering and positioning the apparatus (steps 802, 804), but in reverse order.

Figure 9:
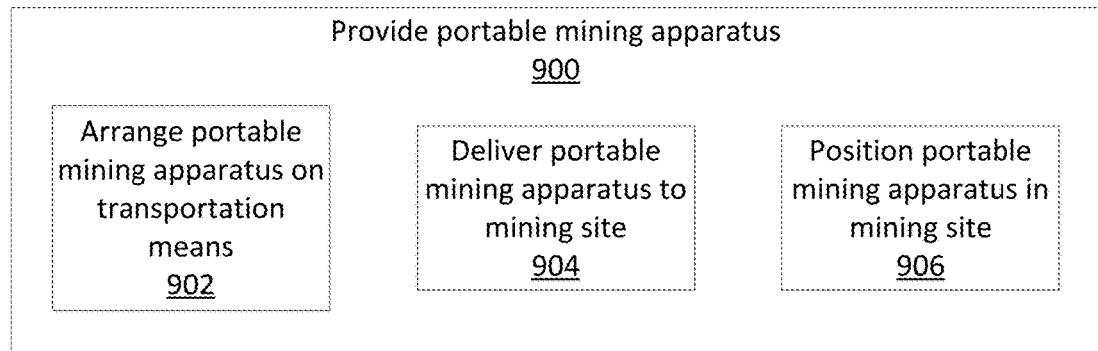
FIG. 9 is an example block diagram of the components comprising providing the portable mining apparatus to the mining site.

FIG. 9 depicts an example block diagram of a system 900 for performing the actions and/or components included in providing a portable mining apparatus. The system 900 can be used to accomplish providing a portable mining apparatus as is shown in step 610 of the processes depicted in FIGS. 6 and 7. In this example, the components include a transport component 902 for arranging the portable mining apparatus on transportation means, a delivery component 904 delivering the portable mining apparatus to the mining site, and a positioning component 906 for positioning the portable mining apparatus in the mining site. Other embodiments may exclude some or all of these steps or add additional steps.

In some embodiments, the transport component 902 the portable mining apparatus is arranged on the transportation means prior to delivery. Examples of transportation means are provided above. In some embodiments, the portable mining apparatus is integrally connected to the transportation means, an example of which is shown and described in more detail with reference to FIG. 5. In other embodiments, the portable mining apparatus is affixed to a travel platform, where the travel platform is configured to be transported by, for example, a semi-truck trailer, a railroad car, or placed inside a shipping container. In another embodiment, some or all of the portable mining apparatus is transported as modular components and assembled at the mining site.

The delivery component 904 and positioning component 906 provide for delivering the portable mining apparatus to the mining site and positioning the portable mining apparatus in the mining site operate as described in connection with corresponding steps of FIG. 8. In particular, these components perform features discussed in connection with steps 802, 804, respectively of FIG. 8.

Figure 10:
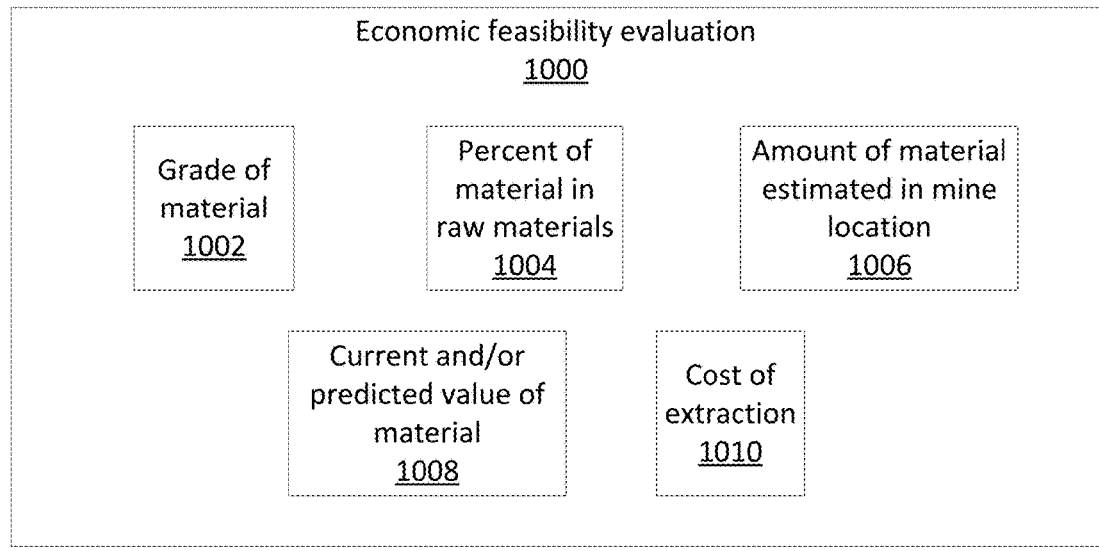
FIG. 10 is an example block diagram of the components comprising the economic feasibility evaluation used in the mining site evaluation.

FIG. 10 depicts an example block diagram of the components included in an economic feasibility evaluation system 1000. The economic feasibility evaluation system 1000 can, in some embodiments, be used to evaluate economic feasibility of a mining site, as is discussed above in connection with steps 808-809 of FIG. 8, which can provide aspects of the mining site evaluations 640, 803 in FIGS. 7 and 8, respectively. The example economic feasibility evaluation system 1000 includes various analysis components, including a grade analysis component 1002 which determines a grade of the material, as well as a rate component 1004 that determines the percent of target material in raw materials. In addition, an amount analysis component 1006 determines an amount of material estimated to be in the mine location, a value component 1008 determines the current and/or predicted value of the material, and a cost component 1010 determines the cost of extraction (based on current and/or expected costs). Other embodiments may exclude some or all of these components or add additional components for use in the analysis.

In some embodiments, a negative or unfavorable result of any one of the considerations in the evaluation system 1000 could result in mining operations ceasing at the mining site. Alternatively, in some embodiments, a strong or overwhelmingly positive result of any one of the considerations could result in mining operations continuing, expanding, or a permanent processing structure being constructed at the mining site.

In some embodiments, some or all of the considerations in the evaluation system 1000 are used to determine if a mining site that is designated as an "explorer," "greenfield" or "exploration" site should be redesignated as a "producer" or "production" site. That is, the explorer site has that designation because the mining site has not undergone, or has previously failed, the economic feasibility evaluation, an example of which is provided herein.

In this example, and as shown and described in more detail with reference to FIG. 8, the entity performing or commissioning the feasibility evaluation decides whether they wish to continue operations at the mining site. If they do not, then the portable mining apparatus is either relocated within the mining site or it is removed from the site. If they do, then, for instance, the portable mining apparatus continues operation or a permanent processing structure is constructed at the mining site, where the portable mining apparatus can be used until the permanent structure is operational and the portable mining apparatus is eventually removed from the mining site.

In some embodiments, the grade of the material, as determined by the grade analysis component 1002, is a consideration in the economic feasibility determination performed by the evaluation system 1000. In some embodiments, the portable mining apparatus processes earth containing precious metals, where the precious metals are the desired extracted product from the mining site. Precious metals have different grades, for example based on purity or quality of the metal. As the grade of the precious metal diminishes, the economic value of the metal per unit weight sold diminishes as well.

In some embodiments, the percent of desired material in raw materials, as determined by the rate component 1004, is a consideration in the economic feasibility determination performed by the evaluation system 1000. The percent of desired material can be calculated by, for example, weighing a sample of extracted raw materials, processing the sample to extract the target material, weighing the extracted target material, and then dividing the weight of the extracted target material by the weight of the raw material sample and multiplying by 100. In some embodiments, the percent of the desired or target material is calculated for different locations in the mining site and averaged. As the percent of the desired material in the extracted raw materials decreases, the cost and time for extracting the desired material increases.

In some embodiments, the amount of material estimated to be in the mine location, as determined by the amount analysis component 1006, is a consideration in the economic feasibility determination performed by the evaluation system 1000. In some embodiments, the amount of precious metal or other target material can be estimated using, for example, the amount of target material as a percentage of extracted raw material and/or additional considerations, such as exploratory drilling results. In some embodiments, the estimated percentage of target material in the raw material is multiplied by the volume of the estimated mining site, which is used to estimate the total weight of salable target material located within the mining site.

In some embodiments, the current and/or predicted value of the target material is determined by a value component 1008, and included as a consideration in the economic feasibility determination performed by the evaluation system 1000. In some embodiments, the current market value of the target material is used to determine whether continued extraction is economically feasible. In some embodiments, the predicted future value of the target material, based on considerations the discussion of which is beyond the scope of this application, is used to determine whether continued extraction is economically feasible. In other embodiments, both the current and the predicted future value of the target material are used in the economic feasibility analysis. A predicted future value of a target material can take into account both market effects and the effect of a site qualifying as a producer site, rather than as an explorer site, as noted above. This generally involves incorporating a price premium in the value based on the status of the site.

In some embodiments, the cost of extraction, as determined by the cost component 1010, is a consideration in the economic feasibility determination performed by the evaluation system 1000. The cost of extraction varies depending upon, for example, the topography of the mining site; the percentage of target material in the raw materials; the type of raw materials that must be processed; the machinery and manpower required to extract, transport, and process the raw and target material; the energy and number of components required by the portable mining apparatus to process the raw material; and the cost of leasing or purchasing access to the mining site. In some embodiments, the cost of extraction is calculated as a unit rate, such as, for example, dollars per ounce extracted precious metal, dollars per day of mine operation, or as a predicted rate of profit based on the current or future market value of the target material.

Referring to FIGS. 6-10 generally, it is noted that some or all of the components and/or steps described herein may not be performed in all embodiments. Furthermore, it is noted that the methods of use described herein represent example methodologies for determining economic benefits from use of a portable mining apparatus, or mining material processing. In particular, the use of such an apparatus can help to qualify a site as a producer site, thereby allowing the mine operator to obtain a higher valuation per ounce of metal in the mine site than possible with the site classified as an explorer site, which in turn leads to a higher market capitalization.

Figure 11:
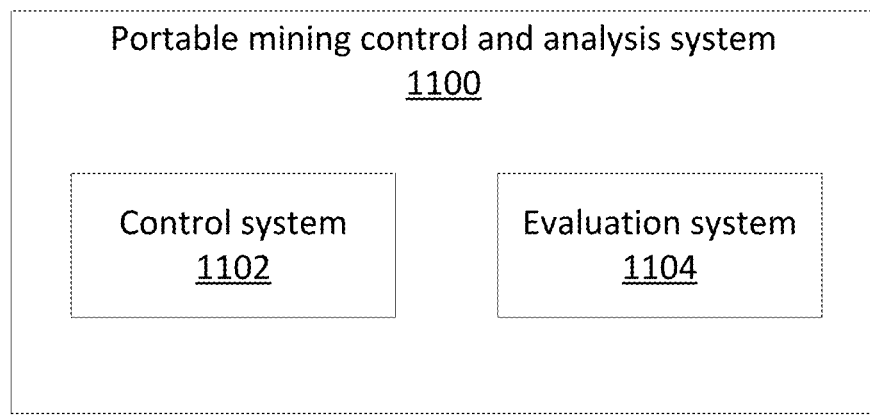
FIG. 11 is an example block diagram of the components comprising the portable mining control and analysis system.

FIG. 11 depicts an example block diagram of the components included in a portable mining control and analysis system 1100. The example portable mining control and analysis system 1100 includes various analysis components, including a control system 1102 and an evaluation system 1104. The control system 1102 can, in some embodiments, be used to control the portable mining apparatus systems, as is discussed above with reference to FIGS. 1-5. The evaluation system 1104 can, in some embodiments, perform the analyses depicted and described above with reference to FIGS. 6-10.

In an example embodiment, a computing system is used to control the systems of FIGS. 1-5 or perform the analysis of FIGS. 6-10, or both. In general, the computing system includes a processor communicatively connected to a memory via a data bus. The processor can be any of a variety of types of programmable circuits capable of executing computer-readable instructions to perform various tasks, such as mathematical and communication tasks. The memory can include any of a variety of memory devices, such as using various types of computer-readable or computer storage media. A computer storage medium or computer-readable medium may be any medium that can contain or store the program for use by or in connection with the instruction execution system, apparatus, or device. In the context of the present disclosure, a computer storage medium includes at least some tangible component, i.e., is not entirely consisting of transient or transitory signals.

In other embodiments, the systems of FIG. 11 can be implemented or performed by a user. For example, the user implementing control system 1102 can be an operator, owner, or a lessee or an employee of a lessee of the mining apparatus. In some embodiments, the user implementing evaluation system 1104 is a different person or entity from the user implementing the control system 1102. In some embodiments, the user implementing the evaluation system 1104 can be a third-party analyst, where the analyst is employed by an entity that is not the portable mining apparatus owner or the portable mining apparatus lessee. Alternatively, the user implementing the evaluation system 1104 can be an employee of the portable mining apparatus owner or lessee, or in other embodiments, a team of employees from either or both the portable mining apparatus owner or lessee, with, potentially, one or more third party analysts.

Embodiments of the present disclosure can be implemented as a computer process (method), a computing system, or as an article of manufacture, such as a computer program product or computer readable media. The computer program product may be a computer storage media readable by a computer system and encoding a computer program of instructions for executing a computer process. Accordingly, embodiments of the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope.

The invention claimed is:

1. A method for qualifying a mining site, comprising:
   determining a first classification of a mining site, the first classification including explorer site;
   receiving a portable mining apparatus at the mining site, the portable mining apparatus including a heavy metals separating subsystem and a water recycling subsystem;
   providing raw mining material to one or more classifying screens of the heavy metals separating subsystem, thereby separating particles above a predetermined size from classified-material, the classified material being precious metal;
   forming a slurry in a slurry tank of the heavy metals separating subsystem by providing water and the classified material to the slurry tank;
   separating heavy metals from the slurry using a heavy metals concentrating assembly of the heavy metals separating subsystem;
   receiving, with the water recycling subsystem, tailings from the heavy metals concentrating assembly and separating the tailings into recyclable water and solid waste;
   providing the recyclable water to the heavy metals separating subsystem for reuse;
   based on success in extracting classified material, evaluating the feasibility of the mining site, wherein evaluating the feasibility includes analyzing a cost of extracting the classified material; and
   based on the feasibility of the mining site, determining a second classification of the mining site.

2. The method of claim 1, further comprising:
   removing the portable mining apparatus from the mining site.

3. The method of claim 1, wherein evaluating the feasibility is performed by analyzing a grade of the classified material, an amount of the classified material, a market value of the classified material, or a cost of extracting the classified material.

4. The method of claim 3, wherein the portable mining apparatus continues operation at the mining site after the evaluation.

5. The method of claim 3, wherein the evaluation results in the removal of the portable mining apparatus from the mining site.

6. The method of claim 5, further comprising:
constructing a non-portable processing system at the mining site.

7. The method of claim 1, wherein receiving the portable mining apparatus comprises leasing the portable mining apparatus for a predetermined period of time, wherein evaluating the feasibility of the mining site occurs based on operation of the portable mining apparatus within the predetermined period of time.

8. The method of claim 1, wherein providing raw mining material includes providing raw mining material to a mobile processing apparatus configured to process raw mining material.

9. The method of claim 8, wherein providing raw mining material to the mobile processing apparatus comprises providing raw mining material to a vehicle-mounted apparatus.

10. The method of claim 1, wherein a computing system is configured to evaluate the feasibility of the mining site.

11. The method of claim 1, further comprising:
extracting the raw mining material from the mining site;
processing the delivered raw mining materials with the portable mining apparatus;
separating metals from the raw mining materials with the portable mining apparatus; and
based on a success rate in separating metals from the raw mining materials, removing the portable mining apparatus from the mine site.

12. The method of claim 11, wherein at least one component of the portable mining apparatus, the portable mining apparatus receiving raw mining material, is mounted to a vehicle-portable platform.

13. The method of claim 12, wherein receiving the portable mining apparatus comprises receiving:
a metals separating subsystem receiving the raw mining material provided to the portable mining apparatus;
wherein the metals separating subsystem includes at least one gravimetric separation device; and
a water recycling subsystem.

14. The method of claim 13, wherein providing raw mining material to the portable mining apparatus occurs after positioning the portable mining apparatus in the mining site.

15. The method of claim 11, wherein the separating of metals recovers less than 90% of the metals contained within in the delivered raw mining materials.

* * * * *